United States Patent Office 2,899,436
Patented Aug. 11, 1959

2,899,436

PIPERAZINE ETHERS AND THEIR METHOD OF PREPARATION

Henri Morren, Forest-Brussels, Belgium, assignor to Union Chimique Belge Societe Anonyme, Brussels, Belgium, a corporation of Belgium No Drawing. Application January 17, 1957
Serial No. 634,608

Claims priority, application Belgium October 30, 1953

7 Claims. (Cl. 260—268)

The present invention relates to new derivatives of piperazine having the general formula

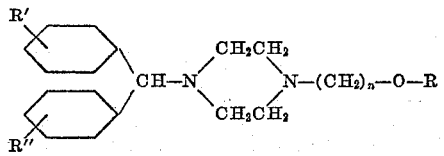

wherein R' and R" are a hydrogen atom, a halogen atom, an alkyl group, or an alkoxy group, R' and R" being in ortho, meta, or para positions, R contains 2 to 11 carbon atoms and is alkyl, phenyl, alkyl substituted phenyl, aralkyl, cycloalkyl, hydroxyalkyl, hydroxycycloalkyl or —$CH_2$—$CH_2$—O—$CH_2$—$CH_2$—OH, and $n$ is an integer from 1 to 6, inclusive. The invention also relates to the mineral acid salts and the organic acid salts of these piperazine derivatives and to methods of preparing these derivatives as well as their said salts.

It has been found that the compounds of this formula are histamine antagonists, viz. "antihistamines," and are useful in the treatment of allergy, for example urticaria. They are capable of neutralizing toxic doses of histamine and of maintaining this activity for several days. These new piperazine derivatives are sedatives as well.

Compounds corresponding to the above-described formula are suitably prepared by several methods. For example, the compounds of the invention may be prepared by reacting a benzohydryl piperazine of the formula

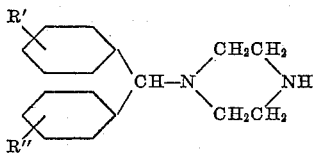

with a halogenoalkoxylated derivative of R, advantageously in the presence of a halogenohydric acid acceptor, such as triethyl amine, according to the reaction (I)

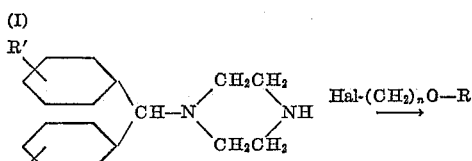

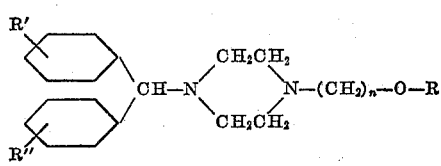

The new derivatives of the invention are also suitably prepared by reacting a benzohydryl halide of the formula

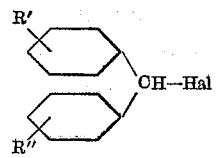

with a piperazine ether of R having the formula

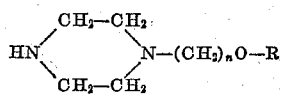

According to the equation:

(II)

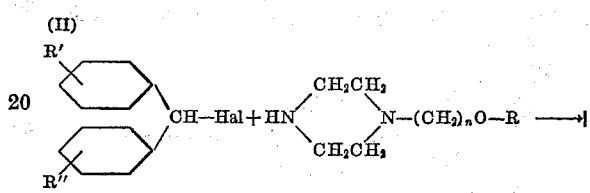

Another method of making the new derivatives of this invention involves the reaction of a piperazine derivative of the formula

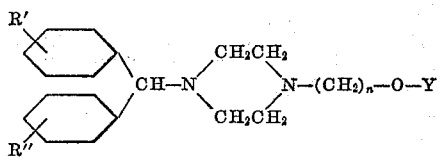

wherein Y stands for hydrogen or an alkali metal with a halide of R. According to the equation:

(III)

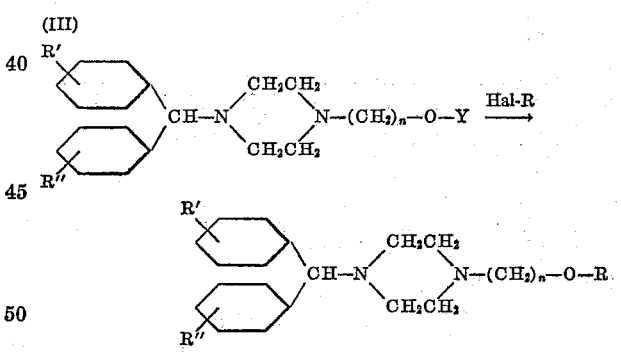

The liberated halogenohydric acid combines with the alkali metal, or when Y equals H, the product of the reaction itself acts as an acceptor of the halogenohydric acid.

The piperazine derivatives of the invention are also suitably prepared by reacting a compound of the formula

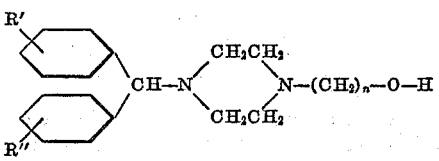

with thionyl chloride and reacting the chloro derivative thus produced with a metallic derivative of the formula ROMe, wherein Me is an alkali metal, according to the following equation:

(IV)
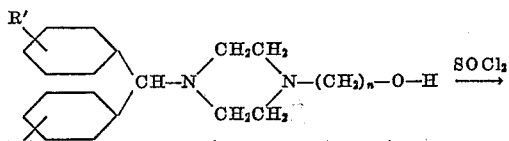

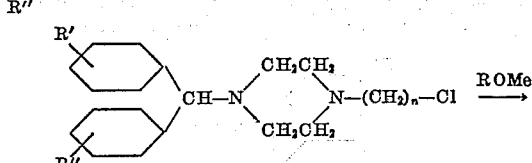

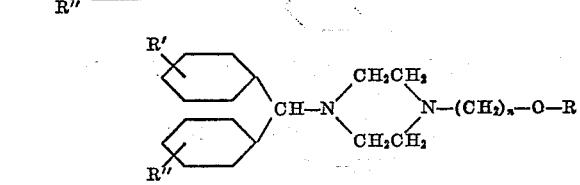

where R is —(CH₂)₂OH the corresponding derivatives may also be prepared by reacting a piperazine derivative of the formula

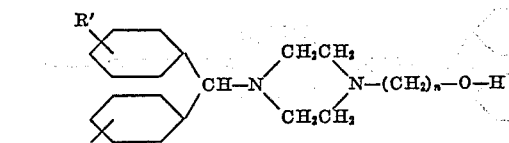

with ethylene oxide according to the following equation:
(V)

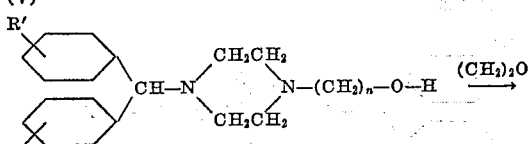

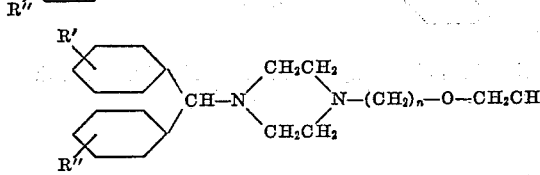

Although, as indicated above, reaction V is applicable only to those compounds wherein R is —CH₂CH₂OH, the other four reactions are of general utility for all compounds of the invention.

Compounds of the above general formula wherein R is —CH₂CH₂OH or —CH₂CH₂—O—CH₂CH₂OH and $n$ the number 2 are also suitably prepared by treating a benzohydryl piperazine of the formula
(VI)

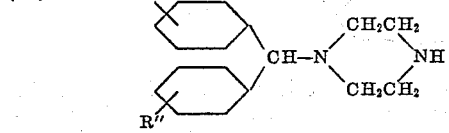

with two or three equivalents, respectively, of ethylene oxide.

In this reaction, a mixture of homolog compounds containing one, two and three ethylene groups is obtained.

Compounds of the invention wherein R is

—CH₂CH₂—O—CH₂CH₂OH may be prepared from the corresponding compound wherein R is —CH₂CH₂OH by the general procedures of reactions III and IV, viz. by treating the compound wherein R is CH₂CH₂OH, or its monoalkali metal derivative, with glycol monohalohydrin, or by treating the compound wherein R is —CH₂CH₂OH with thionyl chloride followed by treatment of the product thus obtained with an alkali metal derivative of glycol.

In the foregoing description, the term alkali metal has its conventional meaning and includes elements such as sodium, potassium, and lithium, but is not limited to these representative elements. Similarly, the term halogen has its conventional meaning and includes chlorine, bromine, iodine, and fluorine. The alkyl and alkoxy radicals designated by R' and R'' may be any such radicals, including alkyl and alkoxy radicals having more than 7 carbon atoms, but preferably they are lower alkyl and lower alkoxy radicals, viz. having 1 to 7 carbon atoms, such as methyl, methoxy, ethyl, ethoxy, propyl, propoxy, butyl, butoxy, pentyl, pentoxy, hexyl, hexoxy, heptyl, and heptoxy.

The following specific examples are further illustrative of the invention.

EXAMPLE 1

Preparation of

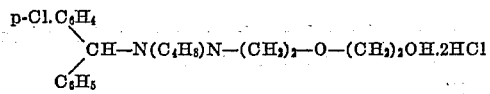

A mixture of 0.1 mol of N-mono-1-p-chlorobenzohydrylpiperazine and 0.1 mol of 1-chloro-2-(2-hydroxyethoxy)-ethane is heated for 3 hours to 150° C. The mass is then taken up in 100 mls. of benzene and 100 mls. of a 10% aqueous solution of NaOH; decanting takes place, and the benzene solution is washed with water and the solvent is evaporated. Vacuum distilling of the residue yields 1-p-chlorobenzohydryl-4-[2-(2-hydroxyethoxy)-ethyl]-piperazine. Boiling point: 220° C./0.5 mm. Hg.

The corresponding dihydrochloride is prepared by dissolving this base in about twice its weight of alcohol, by treating it with excess of gaseous HCl and by precipitating it with ether. The solvent is decanted and the residue, dissolved in a minimum of alcohol, crystallizes on the addition of ether. Melting point: 193° C.

The compounds whose formulae will be given below have been prepared by the method described in Example 1 by using the 2-halogenoethoxylated derivative of an appropriate R:

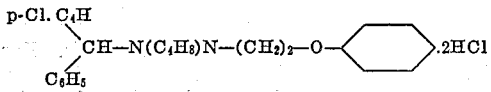

from N - mono - p - chlorobenzohydryl - piperazine and 1-chloro-2-phenoxyethane. Boiling point of the base: 210–212° C./0.005 mm. Hg.

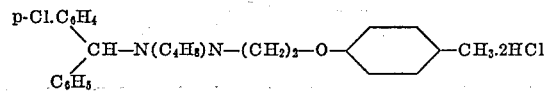

from N - mono - p - chlorobenzohydryl - piperazine and 1-chloro-2-(p-methyl-phenoxy)-ethane. Boiling point of the base: 215°C./0.05 mm. Hg.

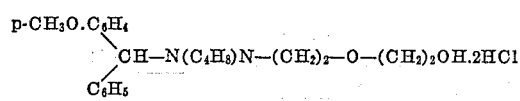

from N - mono - p - methoxybenzohydryl - piperazine and 1-chloro-2-(2-hydroxyethoxy)-ethane. Boiling point of the base: 228° C./0.1 mm. Hg.

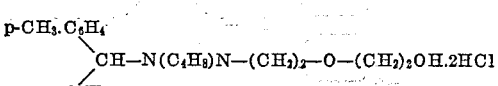

from N-mono-p-methylbenzohydryl-piperazine and 1-chloro-2-(2-hydroxyethoxy)-ethane. Boiling point of the base: 208° C./0.1 mm. Hg.

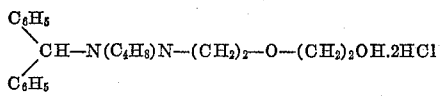

from N-mono-benzohydryl-piperazine and 1-chloro-2-(2-hydroxyethoxy)-ethane. Boiling point of the base: 185° C./0.005 mm. Hg.

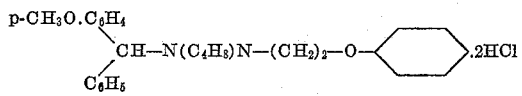

from N-mono-p-methoxybenzohydryl-piperazine and 1-chloro-2-phenoxyethane. Boiling point of the base: 235° C./0.2 mm. Mg. Melting point of the dihydrochloride: 140° C.

EXAMPLE 2

Preparation of

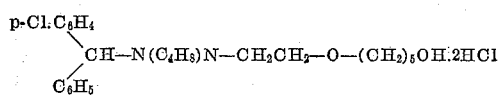

80 grams of 1-p-chlorobenzohydryl-4-(2-hydroxyethyl)-piperazine are dissolved in 300 mls. of dry benzene, and this solution is treated in the cold with 30 grams of thionyl chloride dissolved in 100 mls. of dry benzene. Heating is then carried out under reflux until all the SO₂ has been liberated. The solvent is evaporated in vacuo, the residue is taken up in anhydrous acetone and the hydrochloride of 1-p-chlorobenzohydryl-4-(2-chloroethyl)-piperazine so obtained is filtered.

The corresponding base is liberated by treating the aqueous solution of this hydrochloride with an excess of potassium carbonate. The base is extracted with benzene and the benzene solution is dried over potassium carbonate. This solution is then added to an equimolecular solution of the mono-sodium derivative of 1,5-pentane-diol in an excess of pentane-diol. The benzene is removed by distilling and the residue is heated with stirring on a boiling water bath for 3 hours. The excess of diol is driven off by distillation in vacuo and the residue is taken up in water and benzene. The benzene extract is washed with water several times, concentrated in vacuo, and the residue is distilled in a high vacuum.

The 1-p-chlorobenzohydryl-4-[2-(5-hydroxypentyloxy)-ethyl]-piperazine so obtained distills at 240° C./0.05 mm. Hg.

The corresponding dihydrochloride is prepared by dissolving the above base in about twice its weight of alcohol, by treating with an excess of gaseous HCl, and by precipitating with ether. The solvent is decanted and the residue, dissolved in a minimum of alcohol, crystallizes by addition of ether. The melting point of the dihydrochloride is 173° C.

The 1-p-chlorobenzohydryl-4-(2-hydroxyethyl)-piperazine used as starting material has been obtained by carefully heating with stirring a mixture of 1.2 mol of N-mono-(2-hydroxyethyl)-piperazine and 1 mol of p-chlorobenzohydryl chloride and by maintaining the temperature of the mass at about 150° C. for 15 minutes. The mass was then taken up with water, treated with an excess of potassium carbonate, and extracted with benzene. By redistilling in vacuo the residue obtained after evaporation of the benzene, 1-p-chlorobenzohydryl-4-(2-hydroxy-ethyl)-piperazine is obtained in 70% yields. The boiling point of the compound is 205° C./0.1 mm. Hg.

The compounds whose formulae are given below have been prepared by the method described in Example 2 by using the mono-sodium derivative of the appropriate hydroxylated compound:

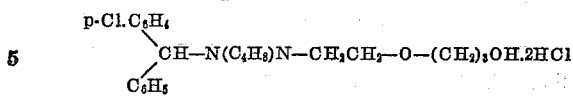

Boiling point of the base: 219° C./0.03 mm. Hg.

The corresponding dihydrochloride crystallizes with 1 mol of ethanol. It loses its alcohol at 115° C.

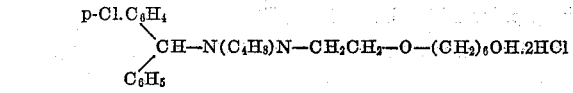

Boiling point of the base: 243° C./0.05 mm. Hg.

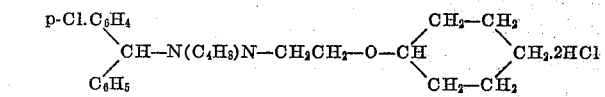

Boiling point of the base: 225° C./0.05 mm. Hg.
Melting point of the dihydrochloride: 196° C.

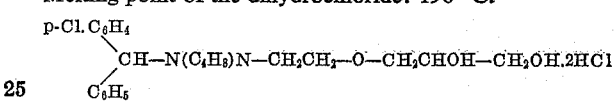

Boiling point of the base: 240° C./0.02 mm. Hg.

The dihydrochloride crystallizes with 1 mol of ethanol which is liberated at 120° C.

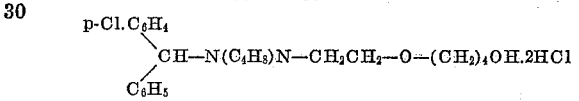

Boiling point of the base 223° C./0.4 mm. Hg.

The dihydrochloride crystallizes with 1 mol of ethanol which is liberated at 115° C.

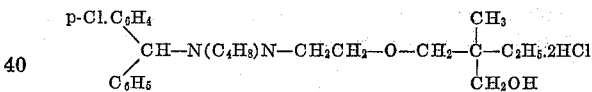

Boiling point of the base: 232° C./0.1 mm. Hg.

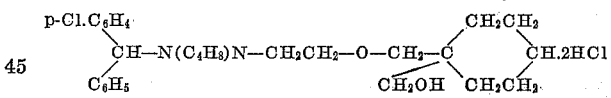

Boiling point of the base: 258° C./0.1 mm. Hg.

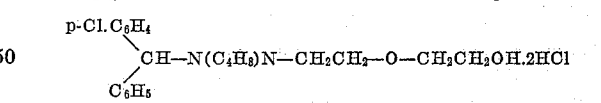

Boiling point of the base: 220° C./0.5 mm. Hg.
Melting point of the dihydrochloride: 193° C.

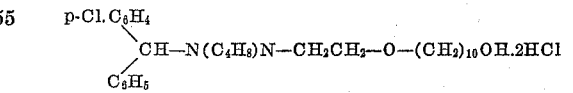

Boiling point of the base: 268° C./0.1 mm. Hg.

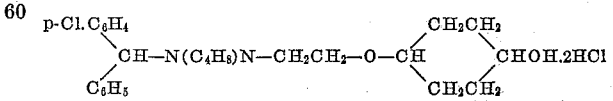

Boiling point of the base: 268° C./0.4 mm. Hg.

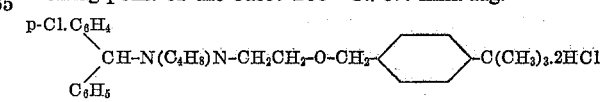

Boiling point of the base: 225-230° C./0.001 mm. Hg.
Melting point of the dihydrochloride: 223° C.

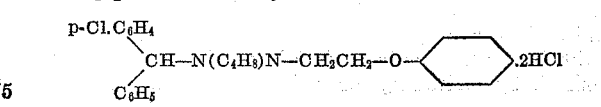

Boiling point of the base: 210–212° C./0.005 mm. Hg.

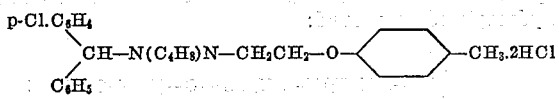

Boiling point of the base: 215° C./0.005 mm. Hg.

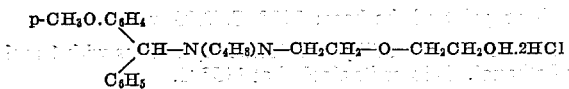

Boiling point of the base: 228° C./0.1 mm. Hg.

The 1-p-methoxybenzohydryl-4-(2-hydroxyethyl)-piperazine necessary for obtaining this product was prepared as the corresponding chlorinated derivative by the method described in Example 2 from p-methoxybenzohydryl chloride and N-mono-(2-hydroxyethyl)-piperazine. Boiling point: 225° C./0.5 mm. Hg.

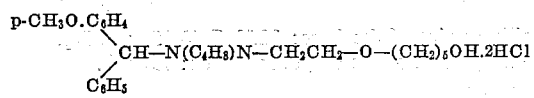

Boiling point of the base: 235° C./0.2 mm. Hg.

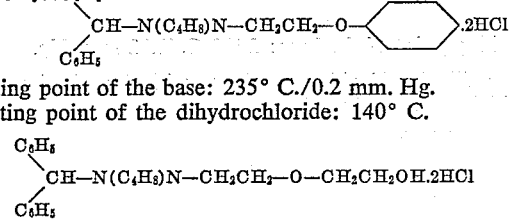

Boiling point of the base: 235° C./0.2 mm. Hg.
Melting point of the dihydrochloride: 140° C.

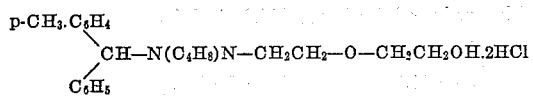

Boiling point of the base: 185° C./0.005 mm. Hg.

The 1-benzohydryl-4-(2-hydroxyethyl)-piperazine necessary for obtaining this product was prepared as the corresponding parachlorinated derivative according to the method described in Example 2 from benzohydryl chloride and N-mono-(2-hydroxyethyl)-piperazine. Boiling point: 180° C./0.01 mm. Hg.

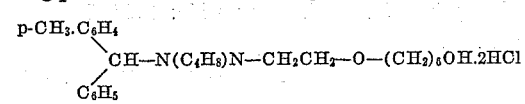

Boiling point of the base: 208° C./0.1 mm. Hg.

The 1-p-methylbenzohydryl-4-(2-hydroxyethyl)-piperazine necessary for obtaining this product was prepared as the corresponding para-chlorinated product according to the method described in Example 2 from p-methylbenzohydryl chloride and N-mono-(2-hydroxyethyl)-piperazine. Boiling point 188° C./0.1 mm. Hg.

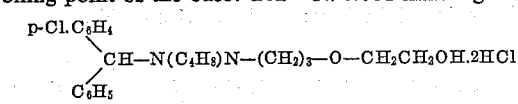

Boiling point of the base: 202° C./0.001 mm. Hg.

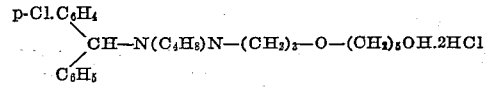

Boiling point of the base: 218–220° C./0.02 mm. Hg.
Melting point of the dihydrochloride: 212° C.

The 1-p-chlorobenzohydryl-4-(3-hydroxypropyl)-piperazine necessary for obtaining this product was prepared as follows: a solution of 0.2 mol of N-mono-p-chlorobenzohydryl-piperazine and 0.4 mol of 3-chloro-propanol-1 in 100 mls. of normal butanol is heated under reflux for 10 hours. After the solvent has been removed by distillation in vacuo, the residue is treated with 100 mls. of an aqueous 15% NaOH solution and extracted with benzene. The latter is driven off, and there is obtained, by redistilling the residue in vacuo, 1-p-chloro-benzohydryl-4-(3-hydroxypropyl)-piperazine in 85% yield and having a boiling point of 215° C./0.01 mm. Hg.

This derivative is converted into 1-p-chlorobenzohydryl-4-(3-chloropropyl)-piperazine as described in Example 2 for obtaining 1-p-chlorobenzohydryl-4-(2-chloroethyl)-piperazine.

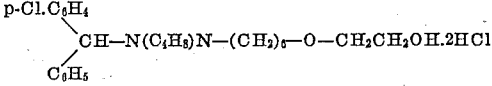

Boiling point of the base: 250–255° C./0.02 mm. Hg.

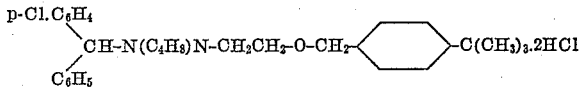

Boiling point of the base: 248° C./0.005 mm. Hg.

The 1-p-chlorobenzohydryl-4-(6-hydroxyhexyl)-piperazine necessary for obtaining this compound was prepared according to the process described above for 1-p-chlorobenzohydryl-4-(3-hydroxypropyl)-piperazine from N-mono-p-chlorobenzohydryl-piperazine and 6-chlorohexanol-1. The product obtained in 90% yield, boils at 235° C./0.01 mm. Hg. It is converted into 1-p-chlorobenzohydryl-4-(6-chlorohexyl)-piperazine as described in Example 2 for obtaining 1-p-chlorobenzohydryl-4-(2-chloroethyl)-piperazine. As however, the hydrochloride is soluble in acetone, it must be treated with ether instead of acetone.

EXAMPLE 3

Preparation of p-Cl.C₆H₄

$$\text{CH-N(C}_4\text{H}_8\text{)N-CH}_2\text{CH}_2\text{-O-CH}_2\text{-}\langle\text{—}\rangle\text{-C(CH}_3\text{)}_3.2\text{HCl}$$

C₆H₅

A mixture of 0.1 mol of 1-p-chlorobenzohydryl-4-(2-hydroxyethyl)-piperazine and 0.1 mol of p-(tertiary-butyl)-benzyl bromide is heated for 3 hours to 150–160° C. The mass is then taken up in 100 mls. of benzene and 100 mls. of a 10% aqueous NaOH solution and after decantation; the benzene solution is washed with water, the solvent is evaporated, and the residue distilled. The condensation product boils at 225–230° C./0.001 mm. Hg.

The corresponding dihydrochloride is prepared by dissolving this base in about twice its weight of alcohol, by treating it in an excess of gaseous HCl, and by precipitating with ether. The solvent is decanted and the residue, dissolved in a minimum of alcohol, crystallizes by the addition of ether. The melting point of the compound is 223° C.

The 1-p-chlorobenzohydryl-4-(2-hydroxyethyl)-piperazine necessary for obtaining this product has been obtained by careful heating with stirring a mixture of 1.2 mol of N-mono-(2-hydroxyethyl)-piperazine and 1 mol of p-chlorobenzohydryl chloride and maintaining the temperature of the mass for 15 minutes at about 150° C. The mass was then taken up in water, treated with an excess of potassium carbonate, and extracted with benzene. By redistilling in vacuo the residue of the benzene evaporation 1-p-chlorobenzohydryl-4-(2-hydroxyethyl)-piperazine having a boiling point of 205° C./0.1 mm. Hg was obtained in 70% yield.

EXAMPLE 4

Preparation of

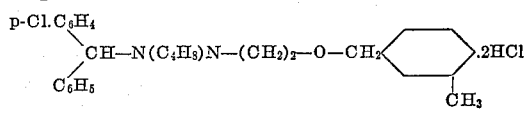

A solution of 0.1 mol of 1-p-chlorobenzohydryl-4-(2-hydroxyethyl)-piperazine in 75 mls. of toluene is added to 150 mls. of an anhydrous toluene suspension of sodium amide prepared from 0.1 atom-gram of sodium and 100 mls. of liquid ammonia. It is heated with stirring under reflux for one hour. It is then treated with a solution of 0.1 mol of m-methylbenzyl bromide in 40 mls. of toluene and heated under reflux for 2 hours. It is washed with water and the organic layer is separated. After the toluene is removed in vacuo, the residue is distilled under high vacuum and 1-p-chlorobenzohydryl-4-[2-(m-methylbenzyloxy)-ethyl]-piperazine is obtained. The boiling point of the compound is 244° C./0.5 mm. Hg.

The corresponding dihydrochloride was prepared as in Example 3.

The derivatives whose formulae are given below have been prepared by the methods described in Examples 3 and 4 by using the halide of an appropriate R:

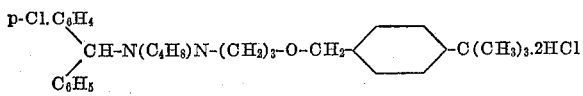

Boiling point of the base: 260–265° C./0.02 mm. Hg.

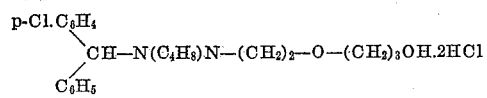

Boiling point of the base: 219° C./0.03 mm. Hg.

The dihydrochloride crystallizes with 1 mol of ethanol which is liberated at 115° C.

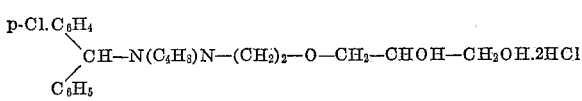

Boiling point of the base: 240° C./0.02 mm. Hg.

The dihydrochloride crystallizes with 1 mol of ethanol which is liberated at 120° C.

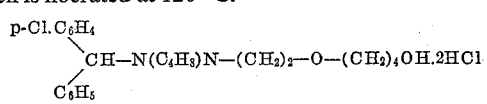

Boiling point of the base: 223° C./0.4 mm. Hg.

The dihydrochloride crystallizes with 1 mol of ethanol which is liberated at 115° C.

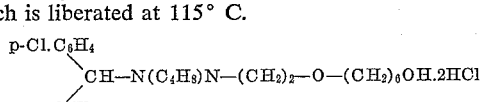

Boiling point of the base: 243° C./0.05 mm. Hg.

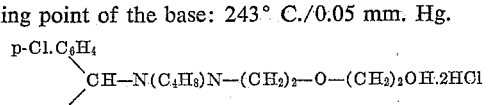

Boiling point of the base: 220° C./0.5 mm. Hg.
Melting point of the di-hydrochloride: 193° C.

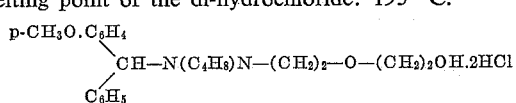

Boiling point of the base: 228° C./0.1 mm. Hg.

The 1-p-methoxybenzohydryl-4-(2-hydroxyethyl)-piperazine necessary for obtaining this product was prepared as the corresponding p-chlorinated derivative according to the process described in Example 3 from p-methoxybenzohydryl chloride and N-mono-(2-hydroxyethyl)-piperazine. Its boiling point is 225° C./0.1 mm. Hg.

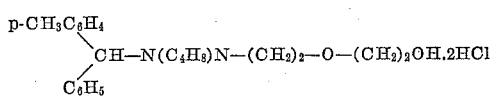

Boiling point of the base: 208° C./0.1 mm. Hg.

The 1-p-methylbenzohydryl-4-(2-hydroxyethyl)-piperazine necessary for obtaining this product was prepared as the corresponding p-chlorinated derivative according to the process described in Example 3 from p-methyl-benzohydryl chloride and N-mono-(2-hydroxyethyl)-piperazine. Its boiling point is 188° C./0.1 mm. Hg.

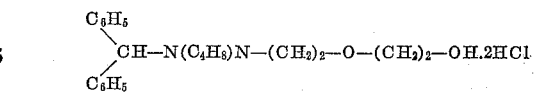

Boiling point of the base: 185° C./0.005 mm. Hg.

The 1-benzohydryl-4-(2-hydroxyethyl)-piperazine necessary for obtaining this product was prepared as the corresponding p-chlorinated derivative according to the process described in Example 3 from benzohydryl chloride and N-mono-(2-hydroxyethyl)-piperazine. The boiling point of the base is 180° C./0.01 mm. Hg.

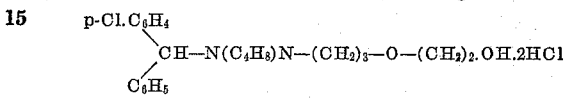

Boiling point of the base: 218–220° C./0.02 mm. Hg.
Melting point of the dihydrochloride: 212° C.

The 1-p-chlorobenzohydryl-4-(3-hydroxypropyl)-piperazine necessary for obtaining this product was prepared as follows: a solution of 0.2 mol of N-mono(p-chlorobenzohydryl)-piperazine and 0.4 mol of 3-chloropropanol-1 in 100 mls. of normal butanol is heated under reflux for 10 hours. After the solvent has been removed by distillation in vacuo the residue was treated with 100 mls. of an aqueous 15% NaOH solution and extracted with benzene. The latter is driven off and by redistilling the residue in vacuo 1-p-chlorobenzohydryl-4-(3-hydroxypropyl)-piperazine is obtained in 85% yield. The boiling point is 215° C./0.01 mm. Hg.

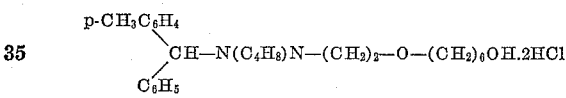

Boiling point of the base: 202° C./0.001 mm. Hg.

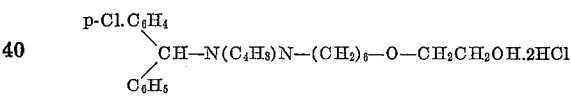

Boiling point of the base: 248° C/0.005 mm. Hg.

The 1-p-chlorobenzohydroyl-4-(6-hydroxyhexyl)-piperazine necessary for obtaining this product was prepared as the corresponding 3-hydroxypropyl derivative (see above) from N-mono-p-chlorobenzohydryl-piperazine and 6-chlorohexanol-1.

The product obtained in 90% yield boils at 235° C./0.01 mm. Hg.

EXAMPLE 5

Preparation of

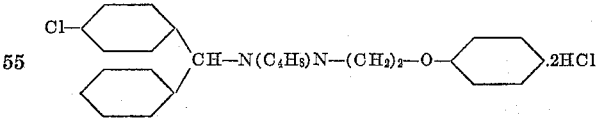

A mixture of 0.1 mol of 1-(1-piperazinyl)-2-phenoxyethane and 0.1 mol of p-chlorobenzohydryl chloride is heated for 3 hours to 150–160° C. The mass is then taken up in 100 mls. of benzene and 100 mls. of a 10% aqueous NaOH solution, and thereupon decanted. The benzene solution is washed with water, the solvent is evaporated and the residue distilled. The condensation product boils at 210–212° C./0.005 mm. Hg.

The corresponding dihydrochloride is prepared by dissolving this base in about twice its weight of alcohol, by treating it with an excess of gaseous HCl and by precipitating it with ether. The solvent is decanted, and the residue, dissolved in a minimum of alcohol, crystallizes upon the addition of ether.

The 1-(piperazinyl)-2-phenoxyethane was obtained by the direct action of 1-chloro-2-phenoxyethane on an excess of anhydrous piperazine by heating for 6 hours to 150–160° C. The mono-substituted product obtained distils at 143–144° C./1 mm. Hg. Some 1,4-bis(2-phenoxyethyl)-piperazine having a boiling point 205–210° C./0.1 mm. Hg is simultaneously obtained.

The products whose formulae will be given below have been prepared by the method described in the Example 5 by using the piperazine ether of appropriate R:

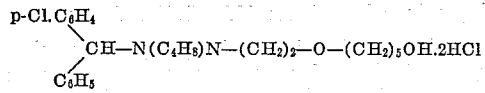

from p-chlorobenzohydryl chloride and 1-(1-piperazinyl)-2(5-hydroxypentyloxy)-ethane. Boiling point of the base: 240° C./0.05 mm. Hg.

The 1-(1-piperazinyl)-2(5-hydroxypentyloxy)-ethane necessary for obtaining this product was prepared as follows: the 1-carbethoxy-4-(2-hydroxyethyl)-piperazine is treated with thionyl chloride to obtain 1-carbethoxy-4-(2-chloroethyl)-piperazine. This chlorinated derivative is then treated with the mono-sodium derivative of 1,5-pentanediol, and the 1-(4-carbethoxypiperazinyl)-2(5-hydroxypentyloxy)-ethane obtained is decarboxylated by alcoholic potassium hydroxide. 1-(1-piperazinyl)-2(5-hydroxypentyloxy)-ethane with boiling point 153° C./0.5 mm. Hg is finally obtained.

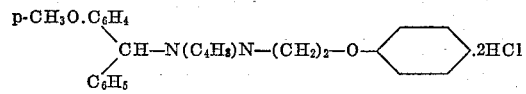

Boiling point of the base: 235° C./0.2 mm. Hg.
Melting point of the dihydrochloride: 140° C.

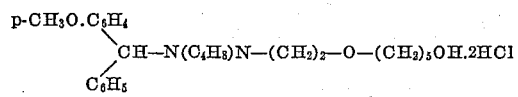

Boiling point of the base: 235° C./0.2 mm. Hg.

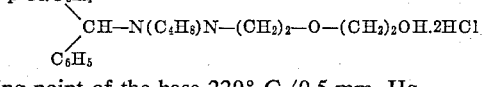

Boiling point of the base 220° C./0.5 mm. Hg.
Melting point of the dihydrochloride: 193° C.

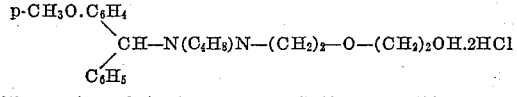

Boiling point of the base: 228° C./0.1 mm. Hg.

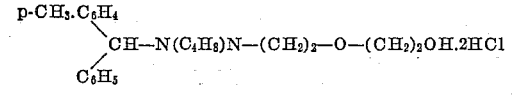

Boiling point of the base: 208° C./0.1 mm. Hg.

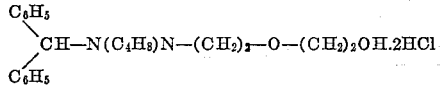

Boiling point of the base: 185° C./0.005 mm. Hg.

The last four products were obtained by the action of an appropriate benzohydryl chloride on 1-(1-piperazinyl)-2(2-hydroxyethoxy)-ethane prepared as follows: a mixture of 1-chloro-2(2-hydroxyethoxy)-ethane and piperazine hexahydrate in excess is heated for two and a half hours to 150° C. After cooling, a stoichiometrical amount of NaOH is added, the water is distilled off, the product is taken up in hot alcohol, the sodium chloride is filtered off, the alcohol is driven off and the product is redistilled in vacuo. The product obtained in 66% yield has a boiling point of 113° C./0.25 mm. Hg.

EXAMPLE 6

Preparation of

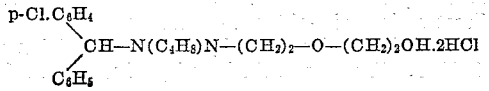

To a toluene solution of 1-p-chlorobenzohydryl-4-(2-hydroxyethyl)-piperazine is added a toluene solution of ethylene oxide in equimolecular proportion. The reaction is achieved by heating in an autoclave to about 170° C. The reaction mass is then redistilled and 1-p-chlorobenzohydryl-4-[2-(2-hydroxyethoxy)-ethyl]-piperazine is separated which distils at 220° C./0.5 mm. Hg.

The corresponding dihydrochloride is prepared by dissolving this base in about twice its weight of alcohol, by treating it with an excess of gaseous HCl, and by precipitating it with ether. The solvent is decanted, and the residue, dissolved in a minimum of alcohol, crystallizes upon the addition of ether. The melting point of the dihydrochloride is 193° C.

The compounds whose formulae are given below have been prepared by the method described in Example 6 by using the appropriate 1-p-R-benzohydryl-4-(omega-hydroxyalkyl)-piperazine:

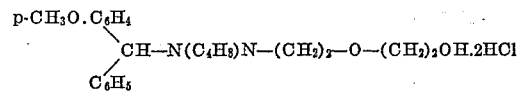

Boiling point of the base: 228° C./0.1 mm. Hg.

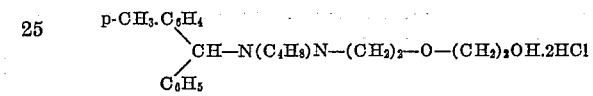

Boiling point of the base: 208° C./0.1 mm. Hg.

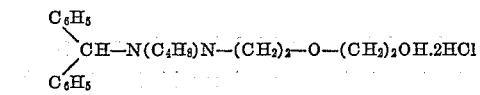

Boiling point of the base: 185° C./0.005 mm. Hg.

The 1-p-R-benzohydryl-4-(2-hydroxyethyl)-piperazine necessary for obtaining the above described compounds has been obtained by heating with stirring an alcoholic solution of 1 mol of N-mono-2-hydroxyethyl-piperazine and 1.5 mol of p-R-benzohydryl chloride in the presence of 1 mol of sodium carbonate for about 18 hours. The alcohol was then evaporated in vacuo, the residue taken up with water and extracted with benzene. The residue from the benzene evaporation was thereafter redistilled in vacuo.

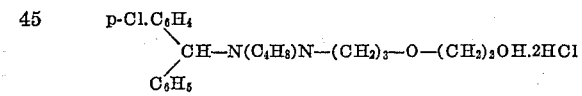

Boiling point of the base: 218–220° C./0.02 mm. Hg.
Melting point of the dihydrochloride: 212° C.

The 1-p-chlorobenzohydryl-4-(3-hydroxypropyl)-piperazine which serves as starting material for obtaining this compound was prepared by heating with reflux a solution of 0.4 mol of 3-chloropropanol-1 and 0.2 mol of N-mono-p-chlorobenzohydryl-piperazine in 100 mls. of normal butanol for 10 hours. After the solvent had been eliminated by distillation in vacuo the residue was treated with 100 mls. of an aqueous 15% sodium hydroxide solution, and extracted with benzene. The latter was driven off, and by redistilling the residue in vacuo there was obtained in 85% yield, 1-p-chlorobenzohydryl-4-(3-hydroxypropyl)-piperazine having a boiling point of 215° C./0.01 mm. Hg.

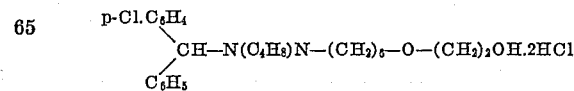

Boiling point of the base: 248° C./0.005 mm. Hg.

The 1-p-chlorobenzohydryl-4-(6-hydroxyhexyl)-piperazine necessary for obtaining this product was prepared in the same manner as the corresponding 3-hydroxypropyl derivative (see above), from N-mono-p-chlorobenzohydryl-piperazine and 6-chlorohexanol-1. The product obtained in 90% yield, boils at 235° C./0.01 mm. Hg.

EXAMPLE 7

*Preparation of 1-p-bromobenzohydryl-4-[2-(2-hydroxyethoxy)-ethyl]-piperazine*

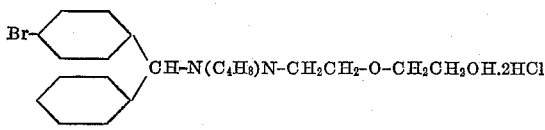

There is first prepared 1-p-bromobenzohydryl-piperazine by the action of p-bromobenzohydryl chloride upon piperazine (boiling point 174° C./0.01 mm. Hg).

There is heated for 6 hours at 130–140° C. a mixture of 0.1 mol of 1-p-bromobenzohydryl-piperazine, 0.2 mol of 2-(2-chloroethoxy)-ethanol, 0.1 mol of triethylamine and 50 cc. of xylene.

After cooling, the mass is taken up with dilute hydrochloric acid and is then extracted with benzene to eliminate excess 2-(2-chloroethoxy)-ethanol. The acid solution is saturated with potassium carbonate and then extracted with benzene. The benzene solution is then washed and distilled.

In this manner there is obtained, with a yield of 80%, 1-p-bromobenzohydryl-4-[2-(2 - hydroxyethoxy) - ethyl]-piperazine having a boiling point of 224° C./0.01 mm. Hg.

The corresponding dihydrochloride is prepared by dissolving this base in absolute alcohol and reacting it with an excess of gaseous hydrogen chloride.

By careful addition of anhydrous ether, the product crystallizes. Melting point of the dihydrochloride: 190–191° C.

EXAMPLE 8

*Preparation of 1-m-bromobenzohydryl-4-[2-(2-hydroxyethoxy)-ethyl]-piperazine*

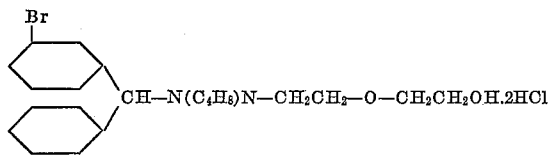

A mixture of 1.5 mol of N-mono-(2-hydroxyethyl)-piperazine and 1 mol of m-bromobenzohydrylchloride is carefully heated with agitation and maintained at about 150° C. for 15 minutes.

The reaction mass is then taken up with water and the aqueous mass is extracted with benzene after being made alkaline. By rectification under vacuum of the residue remaining after evaporation of the benzene extract, there is obtained 1-m-bromobenzohydryl-4-(2-hydroxyethyl)-piperazine with a yield of 75%. Boiling point: 206° C./0.02 mm. Hg.

73 g. of 1-m-bromobenzohydryl-4-(2-hydroxy-ethyl)-piperazine are dissolved in 300 cc. of dry benzene. The resulting solution is treated in the cold with agitation with 36 g. of thionyl chloride dissolved in 100 cc. of dry benzene. The solution is then heated at reflux until all of the sulfur dioxide has been eliminated.

The solvent is then evaporated under vacuum, the residue is treated with anhydrous acetone and filtered and there is thus obtained the hydrochloride of 1-m-bromobenzohydryl-4-(2-chloroethyl)-piperazine.

The corresponding base is liberated by treating the aqueous solution of the hydrochloride with an excess of potassium carbonate. The base is extracted with benzene and the benzene solution is dried over potassium carbonate.

This benzene solution is then added to an equimolecular solution of the mono-sodium derivative of ethylene glycol in a large excess of ethylene glycol. The benzene is eliminated by distillation and the mass remaining is heated on a steam bath for 3 hours while being continuously agitated. The excess glycol is eliminated by distillation under vacuum, the residue is taken up with water and the aqueous mass is extracted with benzene. The benzene extract is then washed several times with water, concentrated under vacuum, and the residual material is then recovered by vacuum distillation.

The 1-m-bromobenzohydryl-4-[2-(2 - hydroxyethoxy)-ethyl]-piperazine obtained distils at 225° C./0.02 mm. Hg.

The corresponding dihydrochloride is prepared by adding a slight excess of an alcoholic solution of hydrochloric acid to an alcoholic solution of the base. Melting point: 208–210° C.

EXAMPLE 9

*Preparation of 1-m-methylbenzohydryl-4-[2-(2-hydroxyethoxy)-ethyl]-piperazine*

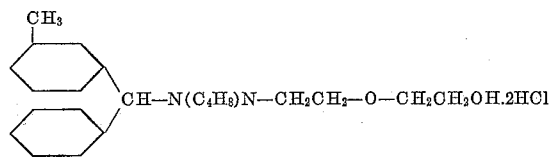

1-m-methylbenzohydryl-4-(2 - hydroxyethyl)-piperazine is produced according to the process described in Example 8 for the preparation of the corresponding m-bromo derivative, viz. by the action of m-methylbenzohydryl chloride on N-mono-(2-hydroxyethyl)-piperazine. The resulting 1-m-methylbenzohydryl-4 - (2 - hydroxyethyl)-piperazine distils at 176° C./0.05 mm. Hg.

A mixture of 0.2 mol of 1-m-methylbenzohydryl-4-(2-hydroxyethyl)-piperazine, 300 cc. of xylene, 15 g. of anhydrous sodium carbonate, and 30 g. of glycol bromohydrin are heated at reflux for 48 hours.

After cooling, the reaction mass is extracted with dilute hydrochloric acid. The acidic solution is added to an excess of potassium carbonate and extracted with benzene. After evaporation of the solvent, the residual liquid is distilled under vacuum to recover the product distilling at 210° C./0.1 mm. Hg.

In place of sodium carbonate there can be used as the hydrohalogen acceptor an alkali metal oxide or the reaction product itself. Melting point of the dihydrochloride: 197–199° C.

EXAMPLE 10

*Preparation of 1-(p-methyl-, p'-methoxy-)-benzohydryl-4-[2-(2-hydroxyethoxy)-ethyl]-piperazine*

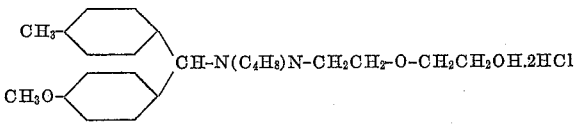

A mixture of 0.2 mol of N-mono-[2-(2-hydroxyethoxy)-ethyl]-piperazine with a xylene solution of 0.2 mol of (p-methyl, p'-methoxy-)-benzohydryl chloride is heated for 3 hours at about 140° C.

The mass is taken up with dilute hydrochloric acid and unreacted methyl-methoxy-benzohydryl chloride is extracted with benzene.

The acid solution is alkalized with an excess of potassium carbonate and is then extracted with benzene. After evaporation of the solvent, the residue is distilled under high vacuum. The 1-(p-methyl-, p'-methoxy-)-benzohydryl-4-[2-(2-hydroxyethoxy)-ethyl]-piperazine which is obtained has a boiling point of 225–230° C./0.01 mm. Hg.

EXAMPLE 11

*Preparation of 1-o-bromobenzohydryl-4-[2-(2-hydroxyethoxy)-ethyl]-piperazine*

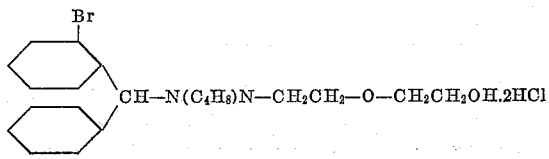

To a benzene solution of N-mono-orthobromobenzohydryl-piperazine is added a toluene solution of 2 equivalents of ethylene oxide. Reaction is then carried out by heating in an autoclave at 170° C. for an hour.

After cooling, distillation under vacuum is effected and there are successively collected in the distillate: toluene, unreacted o-bromobenzohydryl-piperazine (boiling point 160° C./0.02 mm. Hg), 1-o-bromobenzohydryl-4-(2-hydroxyethyl)-piperazine (boiling point 198° C./0.02 mm. Hg), and 1-o-bromobenzohydryl-4-[2-(2-hydroxyethoxy)-ethyl]-piperazine (boiling point 215–220° C./0.01 mm. Hg).

Products having the following formula have been prepared by following the procedures described in Examples 7 to 11 by using the appropriate benzohydryl derivative.

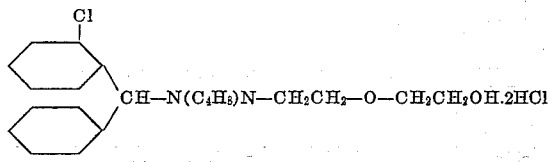

Boiling point of the base: 215° C./0.015 mm. Hg.

The dihydrochloride does not crystallize but is precipitated from ether in the amorphous state. The salt obtained contains a molecule of ether. It begins to melt at about 90° C. and melts completely at 165° C.

The monoquaternized derivative of melting point 168° C. is obtained by treating the base with methyl iodide.

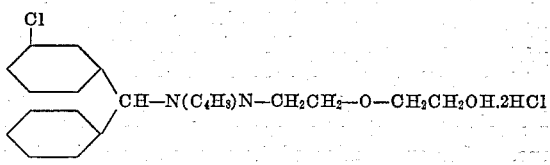

Boiling point of the base: 215° C./0.5 mm. Hg.
Melting point of the dihydrochloride: 213° C.

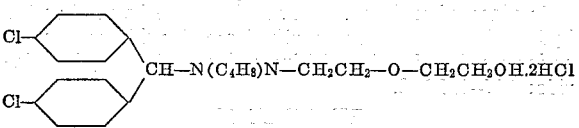

Boiling point of the base: 245° C./0.1 mm. Hg.
Melting point of the dihydrochloride: 205–207° C.

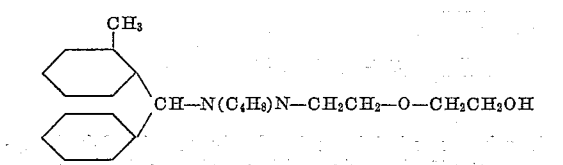

Boiling point of the base: 194° C./0.1 mm. Hg.

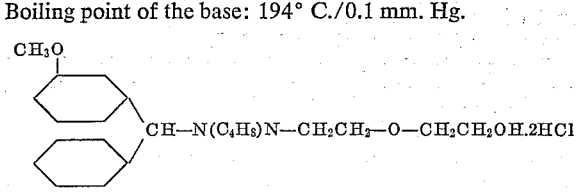

Boiling point of the base: 225° C./0.07 mm. Hg.
Melting point of the dihydrochloride: 190–191° C.

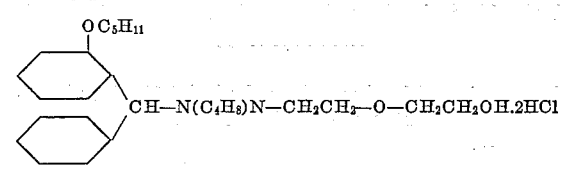

Boiling point of the base: 252° C./0.1 mm. Hg.

In preparing the above products in accordance with the procedure of Example 7, for example, the following compounds are suitably used as starting materials:

1-o-chlorobenzohydryl-piperazine (boiling point: 154° C./0.01 mm. Hg),
1-m-chlorobenzohydryl-piperazine (boiling point: 162° C./0.1 mm. Hg),
1-p,p'-dichlorobenzohydryl-piperazine (melting point: 106° C.; crystallized in petroleum ether),
1-o-methylbenzohydryl-piperazine (boiling point: 148° C./0.01 mm. Hg),
1-m-methoxybenzohydryl-piperazine (boiling point: 160° C./0.02 mm. Hg),
1-o-amyloxybenzohydryl-piperazine (boiling point: 192–195° C./0.2 mm. Hg),
1-(p-methyl-, p'-methoxy-)-benzohydryl-piperazine (boiling point: 180–185° C./0.2 mm. Hg).

A monoquaternized derivative of the several compounds is readily prepared by treating the base with methyl iodide as described above or with other alkyl salt. For example, a monoquaternized derivative having a melting point of 181° C. is obtained by treating the base of Example 8 with methyl iodide. Monoquaternization of this base with dimethyl sulfate gives a salt having an amorphous form.

EXAMPLE 12

*1-p-bromobenzohydryl-4-(2-[2-(2-hydroxyethoxy)-ethoxy]-ethyl)-piperazine*

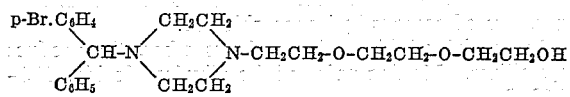

A mixture of 0.1 mol of 1-p-bromobenzohydryl-piperazine, 0.2 mol of triethylene glycol monochlorohydrin, 0.2 mol of triethylamine and 30 cc. of xylene is heated for 6 hrs. at 140° C.

After cooling the reaction mass is taken up with dilute hydrochloric acid and is then extracted with benzene.

The acid solution is saturated with potassium carbonate and extracted with benzene. The benzene solution is then washed with water and distilled.

There is obtained, with a yield of 80%, 1-p-bromobenzohydryl-4-(2-[2-(2-hydroxyethoxy)-ethoxy]-ethyl)-piperazine having a boiling point of 243–250° C./0.02 mm. Hg.

The base thus obtained can be converted into the dihydrochloride by dissolving it in anhydrous ether, filtering it on animal black and treating it with an excess of a solution of hydrochloric acid in ether. The salt thus obtained is amorphous and does not exhibit a definite melting point.

The base can also be quaternized by treating it in acetone with a large excess of methyl bromide or methyl iodide. The quaternary derivative thus obtained do not have a definite melting point. However, analysis shows the presence of an alkyl halide molecule probably attached to the nitrogen atom joined to the ether hydroxy chain.

The corresponding para-chloro derivative can be obtained in the same manner by using 1-p-chlorobenzohydryl-piperazine instead of 1-p-bromobenzohydryl-piperazine. The base obtained has a boiling point of 250° C./0.01 mm. Hg. The dihydrochloride and the corresponding quaternary derivatives can be obtained by the procedure described above.

EXAMPLE 13

*1-o-chlorobenzohydryl-4-(2-[2-(2-hydroxyethoxy)-ethoxy]-ethyl)-piperazine*

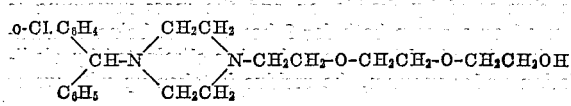

A mixture of 1.5 mol of 1-(2-hydroxyethyl)-piperazine and 1 mol of o-chlorobenzohydryl chloride is heated at 150° C. for 15 minutes. The reaction mass is taken up with water, alkalized with caustic soda and extracted with benzene.

Upon distillation of the benzene extract under vacuum, there is obtained, with a yield of 75%, 1-o-chlorobenzohydryl-4-(2-hydroxyethyl)-piperazine having a boiling point of 205° C./0.02 mm. Hg.

0.2 mol of 1-o-chlorobenzohydryl-4-(2-hydroxyethyl)-piperazine is dissolved in 300 cc. of dry benzene and there is added, in the cold and with agitation, a solution of 36 g. of thionyl chloride in 100 cc. of dry benzene. The mixture is then heated at reflux until evolution of sulfur dioxide ceases.

The solvent is removed by evaporation under vacuum, the residue is taken up with anhydrous acetone and the hydrochloride which has been formed is separated by filtration. The corresponding base is liberated by treating an aqueous solution of the hydrochloride with an excess of potassium carbonate followed by extraction with benzene and drying of the benzene solution of the base over potassium carbonate.

The benzene solution is then added to an equimolecular solution of the mono-sodium derivative of diethylene glycol in the presence of a large excess of diethylene glycol. The benzene is eliminated by distillation and the mass remaining is heated with agitation on a steam bath for 3 hours.

The excess diethylene glycol is removed under vacuum and the residue is taken up with water, then with benzene. The benzene extract is washed several times with water and is then distilled under vacuum. There is obtained 1-o-chlorobenzohydryl - 4-(2-[2-(2-hydroxyethoxy) - ethoxy]-ethyl)-piperazine which distills at 240–245° C./0.01 mm. Hg.

This base can be converted into the dihydrochloride or into a quaternary derivative by following the procedure described in the preceding example.

under high vacuum. The condensation product of the reaction distills at 240–246° C./0.005 mm. Hg.

In place of sodium carbonate there can be used as hydrogen bromide acceptor an alkali metal hydroxide, an alkaline earth oxide or the reaction product itself.

The dihydrochloride and the corresponding quaternary derivatives are obtained by following the procedure described in Example 12.

EXAMPLE 15

*1-m-bromobenzohydryl-4-(2-[2-(2-hydroxyethoxy) - ethoxy]-ethyl)-piperazine*

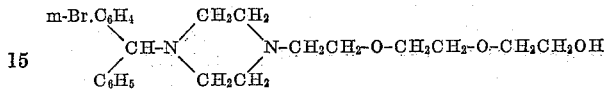

0.2 mol of 1-m-bromobenzohydryl-4-[2-(2-hydroxyethoxy)-ethyl]-piperazine is dissolved in 250 cc. of dry benzene. In the cold and under mechanical agitation there are added 36 g. of thionyl chloride and the mixture is heated until evolution of sulfur dioxide ceases. After cooling, the hydrochloride which has been formed is filtered and washed with anhydrous acetone.

The corresponding base is freed by treating an aqueous solution of the hydrochloride with an excess of potassium carbonate. The base is extracted with benzene and the benzene solution is dried over potassium carbonate.

This solution is then added to an equimolecular solution of the mono-sodium derivative of ethylene glycol in a large excess of ethylene glycol. The benzene is eliminated by distillation and the mass remaining is heated with agitation on a steam bath for 3 hours.

The excess ethylene glycol is removed by distillation under vacuum. The residue is taken up with water and then with benzene. The benzene extract is washed several times with water, concentrated under vacuum and distilled. The condensation product thus produced distills at 240–245° C./0.01 mm. Hg.

The dihydrochloride and the corresponding quaternary derivatives are prepared according to the process described in Example 12.

EXAMPLE 16

*1-m-butyl(n)-benzohydryl-4-(2-[2-(2-hydroxyethoxy)-ethoxy]-ethyl)-piperazine*

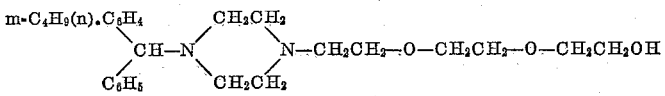

EXAMPLE 14

*1-o-bromobenzohydryl - 4-(2-[2-(2 - hydroxyethoxy)-ethoxy]-ethyl)-piperazine*

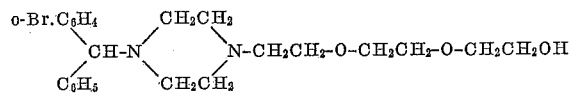

1-o-bromobenzohydryl-4-(2-hydroxyethyl) - piperazine is prepared according to the procedure described in the preceding example and the corresponding o-bromo derivative is obtained by the action of o-bromobenzohydryl chloride upon 1 - (2 - hydroxyethyl) - piperazine. 1 - o - bromobenzohydryl-4-(2-hydroxyethyl) - piperazine distills at 206° C./0.02 mm. Hg.

A mixture of 0.2 mol of 1-o-bromobenzohydryl-4-(2-hydroxyethyl)-piperazine, 15 g. of anhydrous sodium carbonate, 40 g. of diethylene glycol monobromohydrin and 300 cc. of xylene is heated for 48 hours at reflux.

After cooling the reaction mass is extracted with dilute hydrochloric acid. The acid solution is added to an excess of potassium carbonate and extracted with benzene. After evaporation of the solvent the mass is distilled 1 - m - butyl(n)-benzohydryl-4-[2-(2-hydroxyethoxy)-ethyl]-piperazine having a boiling point of 210–215° C./0.01 mm. Hg is prepared by the action of 2-(2-chloroethoxy)-ethanol on 1-m-butyl(n)-benzohydryl-piperazine. This last-named product, which has a boiling point of 160–162° C./0.01 mm. Hg, is obtained by the action of m-butyl(n)-benzohydryl chloride (boiling point: 148–150° C./0.01 mm. Hg) on piperazine.

The chloride is prepared in known manner with m-butyl(n)-benzohydryl which is obtained by the action of benzaldehyde on the magnesium derivative of m-bromobutyl(n)-benzene, followed by decomposition of the complex obtained with water.

A mixture of 0.2 mols of 1-m-butyl(n)-benzohydryl-4-[2-(2-hydroxyethoxy)-ethyl]-piperazine, 15 g. of anhydrous sodium carbonate and 30 g. of ethylene glycol monobromohydrin is heated at reflux for 48 hours.

After cooling the reaction mass is extracted with dilute hydrochloric acid. The acid solution is added to an excess of potassium carbonate and extracted with benzene. After evaporation of the solvent the mass is distilled under high vacuum and the recovered condensation product distills at 250–255° C./0.001 mm. Hg.

EXAMPLE 17

*1-m-methoxybenzohydryl-4-(2-[2-(2-hydroxyethoxy)-ethoxy]-ethyl)-piperazine*

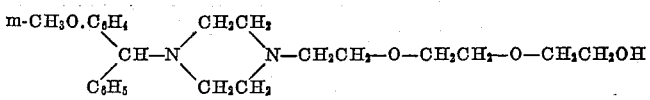

1-(2-[2-(2-hydroxyethoxy)-ethoxy] - ethyl) - piperazine is prepared by the action of a mol of triethylene glycol monochlorohydrin upon 3 mols of piperazine hexahydrate at 120° C. The reaction mixture is then heated for 2½ hours at 150° C.

After cooling an 8 N solution of caustic soda is added. Water is distilled from the mixture under a pressure of several centimeters of Hg. The mass is taken up with boiling alcohol and the insoluble sodium chloride which has been formed is separated by filtration. Alcohol is removed from the mother liquor by distillation and there is obtained, with a yield of 65%, 1-(2-[2-(2-hydroxyethoxy)-ethoxy]-ethyl)-piperazine which has a boiling point of 155° C./1 mm. Hg.

An equimolecular mixture of the above product with m-methoxybenzohydryl chloride in xylene solution is heated for 3 hours at 140° C.

The reaction mass is taken up with dilute hydrochloric acid and the nonreacted m-methoxybenzohydryl chloride is extracted with benzene. The acid solution is alkalized with an excess of potassium carbonate and is then extracted with benzene. After evaporation of the solvent, the residue is distilled under high vacuum and there is recovered the 1 - m - methoxybenzohydryl-4-(2-[2-(2-hydroxyethoxy)-ethoxy]-ethyl)-piperazine which distills at 245–250° C./0.01 mm. Hg.

EXAMPLE 18

*1-(p-methoxy-, p'-methyl-)-benzohydroyl-4-(2-[2-(2-hydroxyethoxy)-ethoxy]-ethyl)-piperazine*

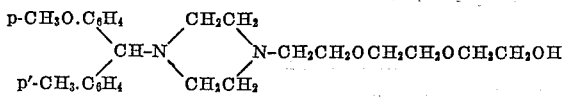

To a toluene solution of 1-(p-methoxy-, p'-methyl-)-benzohydryl)-piperazine there is added a toluene solution of 3 equivalents of ethylene oxide. The mixture is heated in an autoclave at 170° C. for 1 hour.

After cooling the reaction mass is distilled under vacuum and there are successively recovered toluene, 1-(p-methoxy-, p'-methyl-)-benzohydryl-piperazine (boiling point: 180–185° C./0.2 mm. Hg), 1-(p-methoxy, p'-methyl-)-benzohydryl - 4 - (2 - hydroxyethyl)-piperazine (boiling point: 208° C./0.02 mm. Hg), 1-(p-methoxy, p'-methyl-)-benzohydryl-4-[2-(2-hydroxyethoxy) - ethyl]-piperazine (boiling point: 225–230° C./0.01 mm. Hg), and 1-(p-methoxy-p'-methyl - ) - benzohydryl-4-(2-[2-(2-hydroxyethoxy)-ethoxy]-ethyl)-piperazine (boiling point: 245–250° C./0.01 mm. Hg).

Using the methods described in Examples 12 to 18, the following compounds are prepared:

1 - benzohydryl - 4 - (2-[2-(2-hydroxyethoxy)-ethoxy]-ethyl)-piperazine (boiling point: 220–225° C./0.02 mm. Hg);

1 - o - chlorobenzohydryl-4-(2-[2-(2-hydroxyethoxy)-ethoxy]-ethyl)-piperazine (boiling point: 240–245° C./0.01 mm. Hg);

1 - p - chlorobenzohydryl-4-(2-[2-(2-hydroxyethoxy)-ethoxy]-ethyl)-piperazine (boiling point: 250° C./0.01 mm. Hg);

1 - o - bromobenzohydryl-4-(2-[2-(2-hydroxyethoxy)-ethoxy]-ethyl)-piperazine (boiling point: 240–246° C./0.005 mm. Hg);

1-m-bromobenzohydryl - 4 - (2-[2-(2-hydroxyethoxy)-ethoxy]-ethyl)-piperazine (boiling point: 240–245° C./0.01 mm. Hg);

1-p-bromobenzohydryl - 4 - (2-[2-(2-hydroxyethoxy)-ethoxy]-ethyl)-piperazine (boiling point: 243–250° C./0.02 mm. Hg);

1-m-methylbenzohydryl - 4 - (2-[2-(2-hydroxyethoxy)-ethoxy]-ethyl)-piperazine (boiling point: 230–235° C./0.01 mm. Hg);

1 - m-butyl(n)-benzohydryl - 4 - (2 - [2 - (2-hydroxyethoxy)-ethoxy]-ethyl)-piperazine (boiling point: 250–255° C./0.001 mm. Hg);

1 - m-methoxybenzohydryl - 4 - (2 - [2 - (2-hydroxyethoxy)-ethoxy]-ethyl)-piperazine (boiling point: 245–250° C./0.01 mm. Hg);

1 - (p - methoxy-, p'- methyl - ) - benzohydryl-4-(2-[2-(2 - hydroxy-ethoxy) - ethoxy]-ethyl)-piperazine (boiling point: 245–250° C./0.01 mm. Hg).

The new piperazine derivatives of this invention may be associated with a carrier, which may be either a solid material or a sterile parenteral liquid, to form compositions to facilitate dosage. The compositions may take the form of tablets, powders, capsules, syrup, suppositories, or other dosage forms which are particularly useful for oral ingestion. Liquid diluents are employed in sterile condition for parenteral use, that is, by injection. Such a medium may be a sterile solvent such as water. The solid compositions may take the form of active material, viz. piperazine derivative of the formula set forth above, admixed with solid diluents and/or tableting adjuvants such as cornstarch, lactose, talc, stearic acid, magnesium stearate, gums, or the like. Any of the tableting materials used in pharmaceutical practice may be employed where there is no incompatibility with the piperazine derivative. However, the material may be tableted without adjuvants. Alternatively, the piperazine derivative with its adjuvant material may be placed in the usual capsule or resorbable material such as usual gelatin capsule. Secondary disagreeable effects have been observed when gelatin capsules are used for human beings.

The percentage of active ingredient in such compositions may be varied. It is advantageous that the active ingredient constitutes a proportion such that a suitable dosage will be obtained. I have found that the percentage of active agent may be 10 percent, or 50 percent, or even a higher proportion. For example, tablets may be prepared with a minor proportion of diluent and a major proportion of active material. Tablets containing from about 10 to about 100 mg. of active ingredient are particularly useful. The following tablet formulations are intended to be illustrative only and may be varied or modified to a considerable extent:

FORMULATION I

| | Mg. |
|---|---|
| 1-p-chlorobenzohydryl - 4 - [2-(2-hydroxyethoxy)-ethyl]-piperazine | 40 |
| Lactose | 19.2 |
| Starch | 25.7 |
| Talc | 12.6 |
| Carbowax 4000 | 1.2 |
| Calcium stearate | 1.3 |

FORMULATION II

| | Mg. |
|---|---|
| 1-p-chlorobenzohydryl - 4 - [2 - (2-hydroxyethoxy)-ethyl]-piperazine | 16 |
| Lactose | 32.1 |
| Starch | 31.7 |
| Talc | 15.9 |
| Carbowax 4000 | 2.5 |
| Calcium stearate | 1.8 |

In the foregoing examples, the same compound has been shown in some instances as being prepared by several methods. As previously indicated, the several compounds of the invention may be prepared by several methods described and it is not intended that the methods shall be limited solely to the compounds prepared by them in the examples. Furthermore, while the examples show the preparation of the hydrochloride salts, it will be apparent that other inorganic acid salts and organic salts are similarly prepared and are included within the scope of the invention. The inorganic acid salts and the organic acid salts of the invention are, of course, the therapeutically acceptable, non-toxic salts, e.g. the salts of hydrobromic acid, sulfuric acid (acid sulfate salts), citric acid, fumaric acid, maleic acid, and the like.

The examples set forth above describe typical conditions under which the Reactions I, II, III, IV, V and VI are carried out. It will be apparent, however, that satisfactory results may be obtained by varying the conditions. However, for best results, the Reactions I, II, III and IV should be carried out at temperatures between 100 and 160° C. The Reactions V and VI in which ethylene oxide is reacted with the benzohydryl-substituted piperazines are generally carried out in the following manner: ethylene oxide reacts first at room temperature and the reaction is completed by heating in an autoclave at a temperature between 150 and 200° C., preferably 170° C. Stoichiometric quantities of reactants are generally employed except when excess quantities of one or more of the reactants have been indicated above. When hydrohalogenic acceptors are employed they may be, in addition to those specifically mentioned in the examples, conventional acceptors known in the art.

As described in the foregoing portion of this specification, the invention includes compounds having substituents in the benzohydryl radical which are in the ortho, meta, and para position. The compounds containing the substituents in the para position are preferred as histamine antagonists. It has also been observed that the ortho and meta substituted compounds are of therapeutic value.

It will be apparent that various changes and modifications may be made without departing from the scope of the invention as defined in the appended claims and it is intended, therefore, that all matter contained in the foregoing description, particularly in the examples, shall be interpreted as illustrative only and not as limitative of the invention.

This application is a continuation-in-part of my copending application Serial No. 454,821, filed September 8, 1954, of my copending application Serial No. 454,822, filed September 8, 1954, of my copending application Serial No. 454,823, filed September 8, 1954, of my copending application Serial No. 454,824, filed September 8, 1954, and of my copending application Serial No. 454,825, filed September 8, 1954, all now abandoned.

What I claim and desire to secure by Letters Patent is:

1. A compound selected from the group consisting of compounds having the general formula

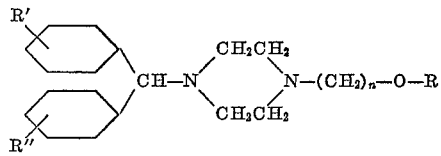

wherein R' and R'' are selected from the group consisting of a hydrogen atom, a chlorine atom, a bromine atom, an alkyl group containing 1 to 7 carbon atoms, and an alkoxy group containing 1 to 7 carbon atoms, R' and R'' being in one of the positions ortho, meta and para, and wherein R contains 2 to 11 carbon atoms and is selected from the group consisting of alkyl, phenyl, alkyl-substituted phenyl, aralkyl, cycloalkyl, hydroxyalkyl, hydroxycycloalkyl, and

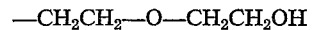

$n$ being an integer from 1 to 6, inclusive, and their acid salts.

2. 1 - p - chlorobenzohydryl - 4 - [2 - (2 - hydroxyethoxy)-ethyl]-piperazine.

3. 1 - p - chlorobenzohydryl - 4 - [2 - (6 - hydroxyhexyloxy)-ethyl]-piperazine.

4. 1 - p - chlorobenzohydryl - 4 -[2 - (4 - hydroxycyclohexyloxy)-ethyl]-piperazine.

5. 1 - p - chlorobenzohydryl - 4 - [2 - (p - t.butylbenzyloxy)-ethyl]-piperazine.

6. 1 - o - bromobenzohydryl - 4 - [2 - (2 - hydroxyethoxy)-ethyl]-piperazine.

7. 1 - o - chlorobenzohydryl - 4 - [2 - (2 - hydroxyethoxy)-ethyl]-piperazine.

References Cited in the file of this patent

UNITED STATES PATENTS

| 2,541,260 | Malkemus | Feb. 13, 1951 |
| 2,630,435 | Baltzly et al. | Mar. 3, 1953 |

OTHER REFERENCES

Hamlin et al.: J. Am. Chem. Soc., vol. 71, pp. 2731–34 (1949).